United States Patent [19]

Van den Sype et al.

[11] Patent Number: 5,441,581
[45] Date of Patent: Aug. 15, 1995

[54] PROCESS AND APPARATUS FOR PRODUCING HEAT TREATMENT ATMOSPHERES

[75] Inventors: Jaak S. Van den Sype, Scarsdale, N.Y.; Alan R. Barlow, Ridgefield, Conn.

[73] Assignee: Praxair Technology, Inc., Danbury, Conn.

[21] Appl. No.: 254,796

[22] Filed: Jun. 6, 1994

[51] Int. Cl.$^6$ ............................................. C01B 21/00
[52] U.S. Cl. .................................... 148/634; 148/206; 148/208
[58] Field of Search ............... 148/634, 206, 208, 216, 148/218

[56] References Cited

U.S. PATENT DOCUMENTS

| | | | |
|---|---|---|---|
| 5,057,164 | 10/1991 | Nilsson et al. | 148/16 |
| 5,069,728 | 12/1991 | Rancon et al. | 148/16 |
| 5,160,380 | 11/1992 | Vocke et al. | 148/206 |
| 5,221,369 | 6/1993 | Bowe et al. | 148/208 |
| 5,242,509 | 9/1993 | Rancon et al. | 148/206 |
| 5,254,180 | 10/1993 | Bonner et al. | 148/208 |
| 5,259,893 | 11/1993 | Bonner et al. | 148/208 |
| 5,298,090 | 3/1994 | Garg et al. | 148/208 |
| 5,320,818 | 6/1994 | Garg et al. | 148/206 |
| 5,348,592 | 9/1994 | Garg et al. | 148/206 |

FOREIGN PATENT DOCUMENTS

34059/93   9/1993   Austria.
WO93/21350 10/1993  WIPO.

Primary Examiner—Scott Kastler
Attorney, Agent, or Firm—Alvin H. Fritschler

[57] ABSTRACT

An endogenerator is provided in which CO and $H_2$ are generated as primary products of hydrocarbon oxidation. Noble metal catalysts such as platinum (Pt) and particularly rhodium (Rh), are loaded on a porous ceramic support, of example, an alumina carrier. In the endogenerator reactor little or no CO and $H_2$ are produced by the slow and energy-intensive reforming reactions and this allows for a compact reactor which operates autothermally without auxiliary heating means, and with high space velocities wherein space velocity is defined as the number of standard cubic feet per hour of output gas per cubic foot of the catalyst carrier. Preferred hydrocarbons are methane or propane, preferred oxidants are nitrogen/oxygen mixtures with from 5% oxygen up to 100% oxygen. The endogenerator of the present invention provides a process and apparatus that generates the required reducing gases CO and $H_2$ for heat treating applications which require leaner atmospheres and lower carbon potentials. The present invention provides a reactor which operates autothermally and in which very high space velocities are achieved. The reactors of the present invention also provide inexpensively the reducing elements required to obtain buffered atmospheres in heat treating furnaces and thereby allow the introduction of inexpensive nitrogen produced by membranes or PSA into such furnaces.

15 Claims, 6 Drawing Sheets

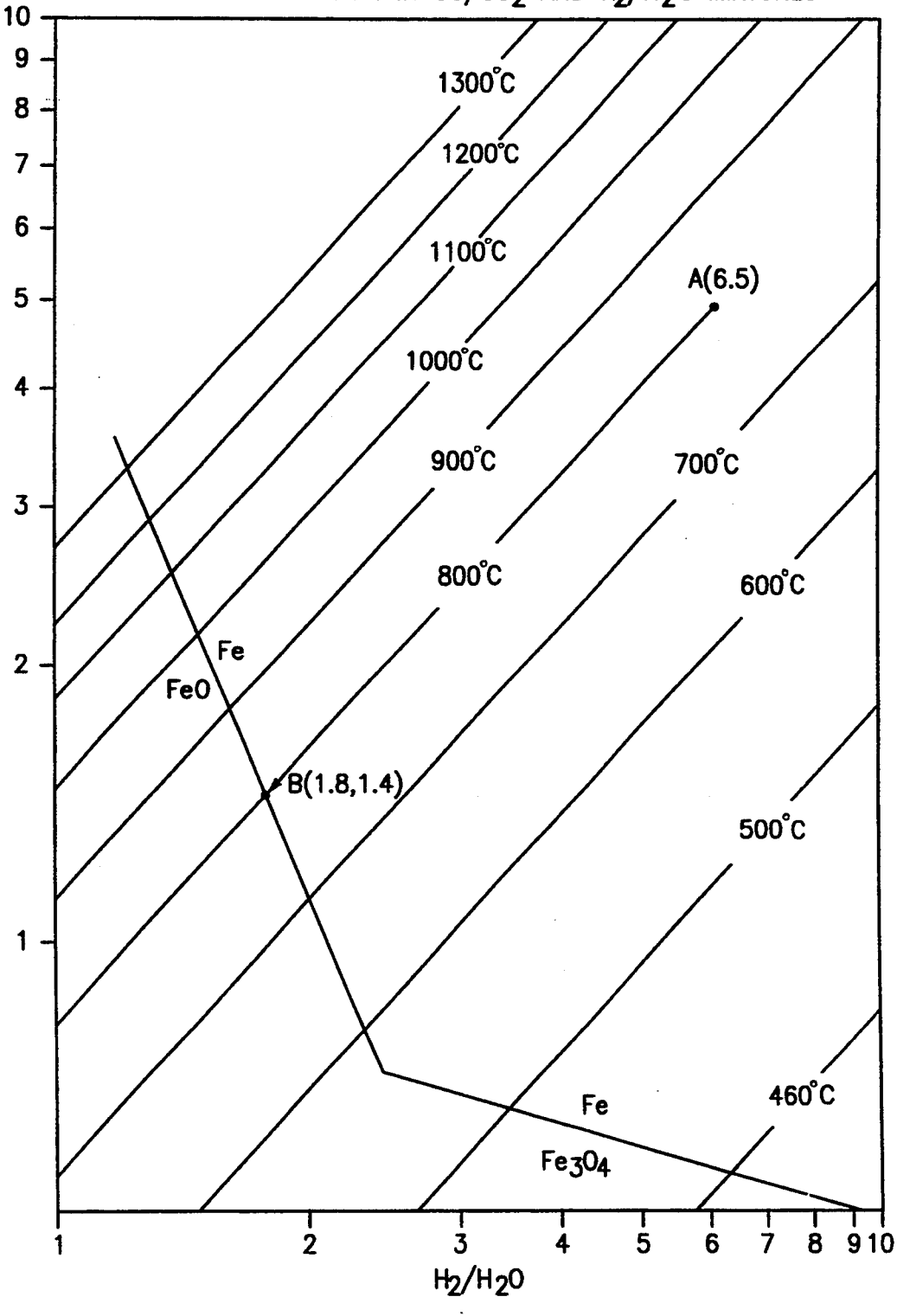

PROCESS AND APPARATUS FOR PRODUCING HEAT TREATMENT ATMOSPHERES

FIELD OF THE INVENTION

The present invention relates to process and apparatus for producing heat treatment atmospheres, and more particularly to process and apparatus for generating atmospheres for heat treating metals, alloys and, metal and ceramic powders.

BACKGROUND OF THE INVENTION

Heat treatment of metals in a furnace requires an inert atmosphere, typically nitrogen. Reducing gases, such as carbon monoxide and hydrogen are added to the nitrogen to provide a buffer against oxygen leakage into the furnace.

The atmosphere compositions required to carry out the heat treating of ferrous and non-ferrous metals and alloys, the brazing of metals and the sintering of metal and ceramic powders are well known in the art.

Although in principle nitrogen is inert with respect to most metals and alloys at heat treating temperatures, in practice, reducing elements such as carbon monoxide and hydrogen (CO and $H_2$) must often be added to the atmosphere composition in order to provide a buffer against inleak of oxygen into the furnace.

The oxygen that leaks into the furnace rapidly reacts with the CO and $H_2$ present to form carbon dioxide and water ($CO_2$ and $H_2O$) and as long as the $CO/CO_2$ and $H_2/H_2O$ ratios stay within desired limits the various heat treating processes can be carried out successfully. The actual $CO/CO_2$ and $H_2/H_2O$ ratios to be established will greatly depend on the particular process involved such as decarburization-free annealing, bright annealing, decarburization annealing and controlled oxide annealing of steels and these are well known in the art. For instance, for bright annealing of steels FIG. 1 shows an oxidation diagram for iron in $CO/CO_2$ and $H_2/H_2O$ mixtures. At 800° C. atmospheres with $CO/CO_2 > 1.4$ and $H_2/H_2O > 1.8$ will not oxidize steels (point B); in practice an atmosphere with $CO/CO_2 = 5$ and $H_2/H_2O = 6$ (point A in FIG. 1) can advantageously be used since it will have an adequate buffer against $O_2$ inleaks.

The known methods of preparing buffered atmospheres of this type fall in two main categories. The first category is generated atmospheres from endogenerators, exogenerators, ammonia dissociators. These atmospheres are inexpensive but they involve bulky equipment, are maintenance intensive and the atmospheres often lack consistency. The second category is atmospheres prepared from cryogenic nitrogen with the admixtures of hydrogen or methanol. These atmospheres are of high quality and very controllable but are also very expensive.

Several commercially practiced or proposed techniques to provide heat treating atmospheres for above-mentioned applications are known. One technique uses exothermic generators wherein atmosphere is produced in a refractory-lined or a direct water-cooled combustion chamber with one or two burners to which a mixture of natural gas and air is delivered from controlled ratio pumping equipment. The generator is equipped with a cooler through which the products of combustion are discharged after removing a portion of the water produced in the reaction. There are two types of exothermic generators commonly used for ferrous annealing, the rich ratio exothermic generators in which the air to fuel ratio is typically about 6; the combustion atmosphere after cooling and removing most of the water will typically consist of 5% $CO_2$, 11% CO, 14% $H_2$ and 69% $N_2$. Although the gas generated atmosphere has a low $CO/CO_2$ ratio and is decarburizing, the atmosphere is suitable for oxide-free annealing of ferrous materials. The other type is the purified exothermic generators in which the combustion gases are compressed and the $CO_2$ and $H_2O$ are removed by pressure-swing adsorption on molecular-sieve beds. Atmosphere is suitable for decarb-free and oxide-free annealing of ferrous materials.

Another known technique uses endothermic generators diluted with nitrogen or exogas. In endothermic generators, the air to natural gas ratio is typically close to 25% of perfect combustion. Reaction takes place over a catalyst bed (usually Ni on Alumina brick) and external heat must be supplied to maintain the reaction. Gas composition from an endogenerator contains approximately 20% $H_2$, 40% CO, balance $N_2$. For annealing applications this gas is diluted in the furnace with $N_2$ gas. The $N_2$ can be from a cryogenic supply or impure $N_2$ from membrane or PSA. Alternatively, the endogas can be diluted with exogas from an exogenerator.

Still another technique employs nitrogen/methanol systems wherein methanol is introduced directly into the furnace and at the furnace temperature dissociates into $H_2$ and CO. For each gallon of methanol approximately 75 CF of CO and 150 CF of $H_2$ are produced. $N_2$ is also injected to obtain the desired atmosphere for annealing. The $N_2$ can be from a cryogenic supply or impure $N_2$ from membrane or PSA.

A further known technique uses internally-mounted endothermic generators wherein endothermic generator is mounted internally in the furnace thereby saving energy and eliminating the floor space requirement of an external generator. The internal generator is supplied with its own electrical heater and a precious metal catalyst is used for higher efficiency and lower space requirement. For annealing applications, dilution of the endogas with $N_2$ can be used. The $N_2$ can be from a cryogenic supply or impure $N_2$ from membrane or PSA.

A still further technique is one in which endothermic conversion of impure nitrogen is used. In this process an endogenerator type reactor is used to convert the $O_2$ present in nitrogen generated by membrane to $H_2$ and CO. Typical membrane purity is low (between 3 and 5%). Resulting atmospheres have between 5 to 8% CO and 10 to 16% $H_2$. Since only a small amount of heat is generated at these low $O_2$ concentrations, it is necessary to preheat the reactants.

Finally, another technique employs the "in-situ" conversion of impure nitrogen. Various methods have been suggested of premixing nitrogen obtained from membranes or PSA with a predetermined quantity of hydrogen and/or hydrocarbon and injecting this mixture into the hot zone of the furnace. The amount of hydrogen and/or hydrocarbon used is several times the amount required for conversion of the oxygen in the impure nitrogen to the complete oxidation products $CO_2$ and $H_2O$. Location and method of injection can be critical.

The aforesaid known techniques all have drawbacks such that they are not totally satisfactory heat treating atmospheres. Exothermic generators are separate pieces of equipment that need to be maintained. Cooling of the combustion gases and subsequent reheating involves thermal inefficiencies. Rich ratio exothermic generators with or without refrigerant dryers are relatively simple to operate and capital costs are modest. However resultant atmospheres are not of high quality and are not suitable for decarb-free annealing. Purified exogenerator atmospheres are of high quality, however capital and operating costs are high, since it involves compressing the combustion gases and there are losses in the use of molecular sieve beds.

Diluted endothermic gas gives a high quality atmosphere; endothermic generators are however more costly to operate than exogenerators and again involve a separate piece of equipment which must be controlled and maintained. Thermal inefficiency due to atmosphere reheating is also a disadvantage as in the case of endogenerators.

Nitrogen/Methanol delivers high quality atmosphere with low capital and maintenance costs. However operating costs are high due to the high cost of methanol. Thermal efficiency is also low since the furnace must provide the heat to dissociate the methanol and bring the injected gases to the furnace temperature.

Internally mounted endothermic generators are relatively new in the technology. Their principal advantage is that no separate generator is required. Furnace atmosphere controls are used to control the output of the generator avoiding duplication. The heat of reaction is not lost so thermal efficiency is high. Standard Nickel or precious metal reforming catalyst is used as in stand-alone generators. Since reforming reactions are slow, space velocities are low and this makes the system bulky which is a disadvantage for internally mounted systems. For example, for one commercially available system, the internally mounted generator delivering 800 SCFH of endogas measures 10.5" diameter and is 32" long.

An example of such a generator is described in U.S. Pat. No. 5,160,380 issued Nov. 3, 1992 to Vocke et al. entitled PROCESS FOR IMPROVED PREPARATION OF TREATMENT GAS IN HEAT TREATMENTS.

The endothermic conversion of the oxygen in membrane nitrogen to CO and $H_2$ has all the disadvantages of external endogenerators and substantially more heat must be provided than for the air/natural gas case. Thermal efficiency is low and capital cost is high.

"In-situ" conversion of impure nitrogen without the use of a catalyst. The principal disadvantage of these methods is that the oxygen in the impure nitrogen will initially give rise to the total oxidation products $H_2O$ and $CO_2$. If only H2 is used, sufficient H2 must be supplied to give the desired $H_2/H_2O$ and $CO_2$. The need for an external $H_2$ source makes this approach expensive. If hydrocarbons such as methane or propane are used, the desired $CO/CO_2$ and $H_2/H_2O$ ratios are obtained through reforming of $CO_2$ and $H_2O$ in the furnace by adding sufficient excess hydrocarbon. These reforming reactions are slow at typical heat treating temperatures particularly when using methane. An example of this is shown in FIG. 2. The desired atmosphere can only be obtained if furnace temperatures are high enough and the gas residence time is long enough for sufficient reforming to take place. Gas composition will therefore be dependent on the operation of the furnace.

Other background references relating to the present subject matter are as follows.

U.S. Pat. No. 5,298,090 issued Mar. 29, 1994, to Garg et al. entitled "ATMOSPHERES FOR HEAT TREATING NON-FERROUS METALS AND ALLOYS" discloses a process for producing low-cost atmospheres suitable for annealing, brazing, and sintering non-ferrous metals and alloys from non-cryogenically produced nitrogen containing up to 5%, residual oxygen. According to the process, suitable atmospheres are produced by 1) pre-heating the non-cryogenically produced nitrogen stream containing residual oxygen to a desired temperature, 2) mixing it with more than a stoichiometric amount a hydrocarbon gas, 3) passing it through a reactor packed with a platinum group of metal catalyst to reduce the residual oxygen to very low levels and convert it to a mixture of moisture and carbon dioxide, and 4) using the reactor effluent stream for annealing, brazing, and sintering non-ferrous metals and alloys in a furnace. The key features of the disclosed process include 1) preheating the non-cryogenically produced nitrogen containing residual oxygen to a certain minimum temperature, 2) adding more than a stoichiometric amount of a hydrocarbon gas to the pre-heated nitrogen stream, and 3) using a platinum group of metal catalyst to initiate and sustain the reaction between oxygen and the hydrocarbon gas.

U.S. Pat. No. 5,259,893, issued Nov. 9, 1993 to Bonner et al., entitled "IN-SITU GENERATION OF HEAT TREATING ATMOSPHERES USING A MIXTURE OF NON-CRYOGENICALLY PRODUCED NITROGEN AND A HYDROCARBON GAS" discloses a process for generating in-situ low-cost atmospheres suitable of annealing and heat treating ferrous and non-ferrous metals end alloys, brazing metals, sealing glass to metals, and sintering metal and ceramic powders in a continuous furnace from non-cryogenically produced nitrogen containing up to 5% residual oxygen. The disclosed process involves mixing nitrogen gas containing residual oxygen with a predetermined amount of a hydrocarbon gas, feeding the gaseous mixture through a nonconventional device into the hot zone of a continuous heat treating furnace, converting residual oxygen to an acceptable form such as a mixture of moisture and carbon dioxide, a mixture of moisture, hydrogen, carbon monoxide, and carbon dioxide, or a mixture of carbon monoxide, moisture, and hydrogen, and using the resultant gaseous mixture for annealing and heat treating metals and alloys, brazing metals, sintering metal and ceramic powders, and sealing glass to metals.

U.S. Pat. No. 5,254,180 issued Oct. 19, 1993 to Bonner et al., entitled "ANNEALING OF CARBON STEELS IN A PRE-HEATED MIXED AMBIENTS OF NITROGEN, OXYGEN, MOISTURE AND REDUCING GAS", discloses an improved process for producing high-moisture containing nitrogen-based atmospheres suitable for oxide and decarburize annealing of carbon steels from non-cryogenically generated nitrogen. These nitrogen-based atmospheres are produced by mixing non-cryogenically generated nitrogen containing less than 5.0 vol. % residual oxygen with a specified amount of hydrogen, humidifying the gaseous feed mixture, feeding the gaseous mixture into the heating zone of a furnace through a diffuser, and converting in-situ the residual oxygen present in it to moisture. According to the present invention, the total amount of hydrogen required for producing suitable atmospheres can be minimized by simultaneously humidifying the feed gas and controlling the residual oxygen level in it.

The key features of the present invention include a) humidifying the feed gas prior to introducing it into the heating zone of a furnace operated above about 600° C., b) selecting the level of residual oxygen in the feed gas in such a way that it minimizes hydrogen consumption, and c) using enough amount of hydrogen to convert completely the residual oxygen present in the feed gas to moisture and to maintain $pH_2/pH_2O$ ratio in the heating zone of the furnace below about 2 for oxide annealing and at least 2 for decarburize annealing carbon steels.

U.S. Pat. No. 5,242,509, issued Sept. 7, 1993 to Rancon et al. entitled "PROCESS OF THE PRODUCTION OF AN ATMOSPHERE FOR THE THERMAL TREATMENT OF METALS AND THERMAL TREATMENT APPARATUS", describes a process wherein the thermal treatment atmosphere is obtained by catalytic reaction of an impure mixture of nitrogen, advantageously obtained by permeation or adsorption, and hydrocarbon, the catalytic reaction being carried out at a temperature between 400° and 900° C., typically between 500° and 800° C., with a noble metal base catalyst, typically platinum or palladium on alumina support. The reaction may be carried out in a reactor placed inside or outside the furnace.

U.S. Pat. No. 5,221,369 issued Jun. 22, 1993 to Bowe et al., entitled "IN-SITU GENERATION OF HEAT TREATING ATMOSPHERES USING NON-CRYOGENICALLY PRODUCED NITROGEN" discloses a process for generating in-situ low-cost atmospheres suitable for annealing and heat treating ferrous and nonferrous metals and alloys, brazing metals and ceramics, sealing glass to metals, and sintering metal and ceramic powders in a continuous furnace from non-cryogenically produced nitrogen containing up to 5% residual oxygen is presented. The disclosed process involves mixing nitrogen gas containing residual oxygen with a pre-determined amount of a reducing gas such as hydrogen, a hydrocarbon, or a mixture thereof, feeding the gaseous mixture through a nonconventional device into the hot zone of a continuous heat treating furnace, converting residual oxygen to an acceptable form such as moisture, a mixture of moisture and carbon dioxide, or a mixture of moisture, hydrogen, carbon monoxide and carbon dioxide, and using the resultant gaseous mixture for annealing and heat treating metals and alloys, brazing metals and ceramics, sintering metal and ceramic powders, and sealing glass to metals.

U.S. Pat. No. 5,069,728 issued Dec. 3, 1991 to Rancon et al., entitled "PROCESS FOR HEAT TREATING METALS IN A CONTINUOUS OVEN UNDER CONTROLLED ATMOSPHERE" describes the heat treating of metals by continuous longitudinal passage of metallic pieces in an elongated treating zone under controlled atmosphere having a high temperature upstream end where the controlled atmosphere comprises nitrogen and reducing chemical substances, such as hydrogen, possibly carbon monoxide, and a downstream cooling end under an atmosphere essentially formed by introducing nitrogen. In the high temperature upstream end, the nitrogen which constitutes the atmosphere is supplied by introducing nitrogen with a residual oxygen content not exceeding 5%. The nitrogen introduced in the downstream cooling end is substantially free of oxygen. Application of the process to the annealing of metallic pieces.

U.S. Pat. No. 5,057,164 issued Oct. 15, 1991 to Nilsson et al , entitled "PROCESS FOR THERMAL TREATMENT OF METALS" discloses a process for thermal treatment of metals by passage of metallic pieces into an elongated zone under a controlled atmosphere, having an upstream section at an elevated temperature, where the controlled atmosphere comprises nitrogen and reductive chemicals, particularly hydrogen, possibly carbon monoxide; and a downstream section at a lower temperature under a controlled atmosphere. The invention is characterized by the fact that in the upstream section at an elevated temperature, the atmosphere comprises nitrogen having a residual content of oxygen between 0.5% and 5% produced by separation of air using permeation or adsorption techniques. The reductive chemicals are present at all times in a content at least sufficient to eliminate the oxygen admitted with the nitrogen. The controlled atmosphere in the section downstream from the elongated thermal treatment zone is formed by admission of a gaseous flow taken from the upstream section at an elevated temperature and transferred directly into the downstream section at a lower temperature.

Australian Patent Application 34059/93 dated Sept. 16, 1993 to Frey, entitled "METHOD AND APPARATUS FOR FORMING A HEAT TREATING ATMOSPHERE", describes a method of forming a heat treating atmosphere by removing at least a substantial portion of the oxygen contained within a feed stream of air to produce a nitrogen rich gas and an oxygen enriched waste gas, mixing the nitrogen rich gas and a substituted or unsubstituted hydrocarbon gas to form a first mixture; and reacting the first mixture in the present of a non-noble metal catalyst to form said heat treating atmosphere containing a predominant amount of nitrogen gas and no more than trace amounts of carbon dioxide and water vapor.

PCT Patent WO 93/21350 Gross et al. dated Oct. 28, 1993 and entitled "METHOD OF PRODUCING A PROTECTIVE OR REACTIVE GAS FOR THE HEAT TREATMENT OF METALS" discloses nitrogen produced by non-cryogenic methods, such as those using pressure-change adsorption or membrane installations, cannot owing to its high oxygen content of about 0.1 to 5% V/V, be used for the heat treatment of metals, or can only be used to a limited degree. The invention proposes an endothermic catalytic conversion of the oxygen contained in the nitrogen by means of hydrocarbons to give a protective gas which is suitable for the heat treatment of metals.

SUMMARY OF THE INVENTION

With non-cryogenic methods to produce nitrogen such as membrane or PSA, the possibility exists to make prepared atmospheres for heat treating applications that are much less expensive. Problems however arise from the residual oxygen present in these sources of nitrogen. The present invention provides reliable methods to convert this residual oxygen into reducing species without unduly raising costs.

Heretofore endogenerators were developed mainly for carburizing purposes. In such applications the highest possible carbon potential is desirable. The catalyst bed (usually Ni-alumina brick) is operated at temperatures between 1000° C. and 1200° C.; space velocities are low and external heat must be supplied. An object of the present invention is to provide an endogenerator for heat treatment that uses a noble metal catalyst operating in a lower temperature range (750° C. to 900° C.) and since the heat treating applications to which the present invention applies require leaner atmospheres and lower carbon potentials, the present invention provides a reactor which operates autothermally and in which very high space velocities are achieved. The reactors of the present invention provide inexpensively the reducing elements required to obtain buffered atmospheres in heat treating furnaces and thereby allow the introduction of inexpensive nitrogen produced by membranes or PSA into such furnaces.

Another object of the present invention is to provide a reactor including a catalyst using noble metals including rhodium, platinum, ruthenium, palladium, osmium and iridium and mixtures thereof.

Another object of the present invention is to provide a reactor including a catalyst carrier of alumina; porous ceramic pellets or monoliths made from magnesia, silica, zirconia, titania or mixtures thereof such as cordierite.

Still another object of the present invention is to provide a reactor using hydrocarbons such as methane (natural gas) or propane or other alkanes such as ethane, butane or other alkenes such as ethylene, propylene.

A further object of the present invention is to provide a catalyst and carrier that can be located internal or external to a heat treating furnace.

Still another object of the present invention is to provide a reactor that requires no auxiliary heating means during a heat treatment-process.

BRIEF DESCRIPTION OF THE DRAWINGS

The above set forth and other features of the invention are made more apparent in the ensuing Detailed Description of the Invention when read in conjunction with the attached drawings, wherein:

FIG. 1 is a curve illustrating an oxidation diagram for iron as $CO/CO_2$ and $H_2/H_2O$ mixtures.

DESCRIPTION OF THE PREFERRED EMBODIMENTS

Figure 3:
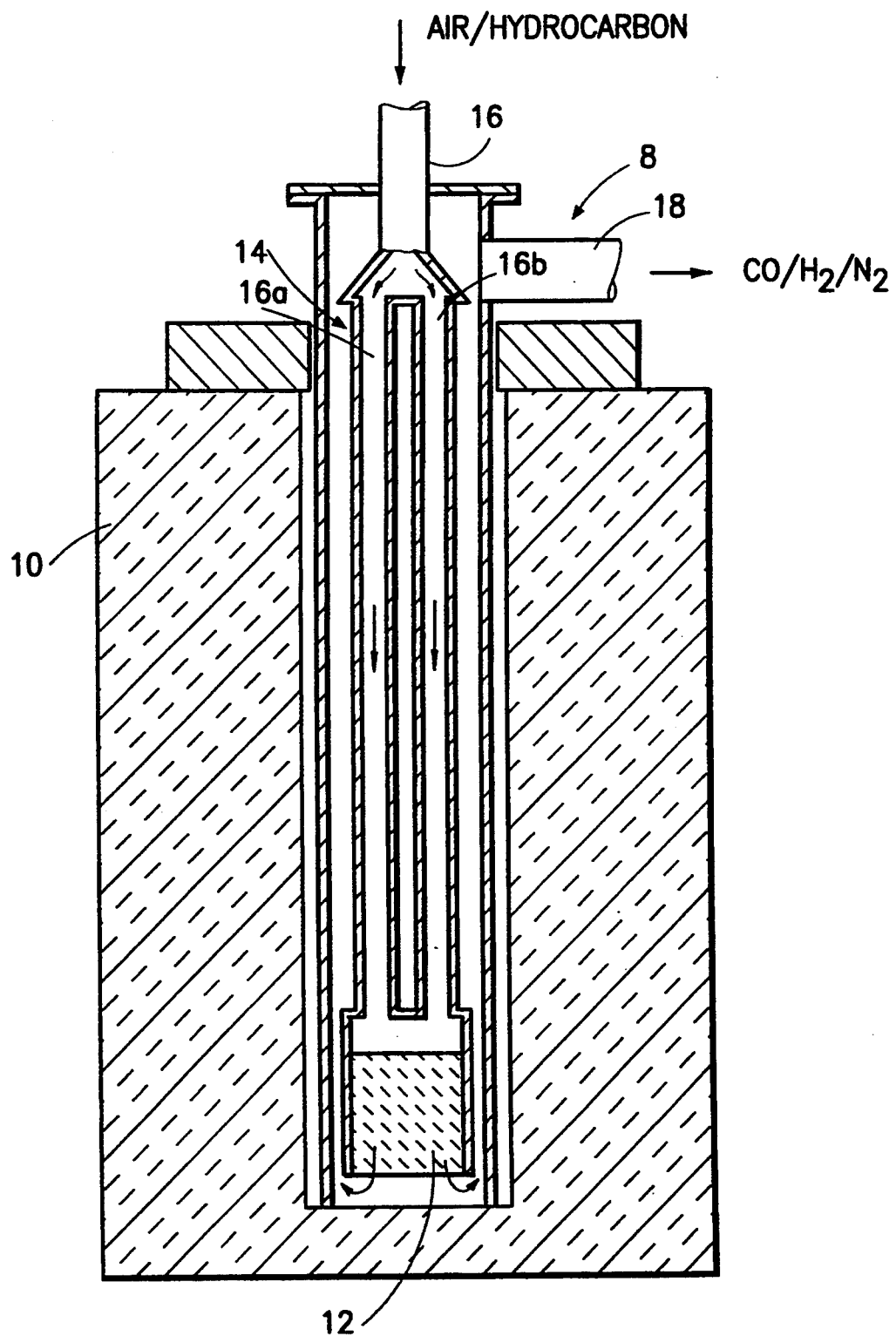
FIG. 3 is a schematic cross-sectional illustration of a reactor including a catalyst and carrier that operates autothermally according to the principles of the present invention.
Figure 2:
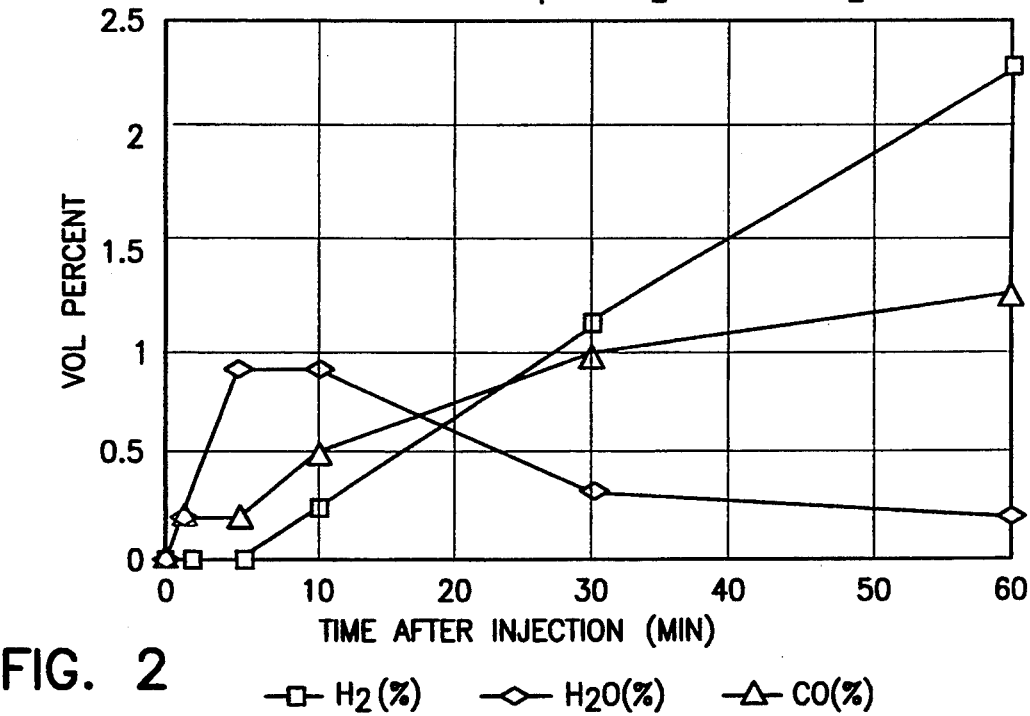
FIG. 2 is a curve illustrating the effect of the direct injection of $CH_4$ in membrane $N_2$ at a temperature of 1380 degrees F.

An endogenerator is provided in which CO and $H_2$ are generated as primary products of hydrocarbon oxidation. Noble metal catalysts such as platinum (Pt) and particularly rhodium (Rh), when sufficiently loaded on a porous ceramic support, for example, an alumina carrier, have CO and H2 selectivities that are high enough to make atmospheres that are suitable for heat treating applications. Thus, the noble metal catalyst can be selected from the platinum group metals: ruthenium, rhodium, palladium, osmium, iridium and platinum. Mixtures of these elements can be used as well.

The preferred catalyst carrier is alumina; however porous ceramic pellets or monoliths made from magnesia, silica, zirconia, titania or mixtures thereof such as corderite can also be used.

In the reactor of the present invention little or no CO and $H_2$ are produced by the slow and energy-intensive reforming reactions and this allows for a compact reactor which operates autothermally without auxiliary heating means, and with high space velocities wherein space velocity is defined as the number of standard cubic feet per hour of output gas per cubic foot of the catalyst carrier. Preferred hydrocarbons are methane (natural gas) or propane. The process can however also be carried out with other alkanes and alkenes or mixtures thereof when the appropriate oxidant/fuel ratio is used for conversion to CO and $H_2$. Examples of other alkanes: ethane, butane, examples of alkenes: ethylene propylene. Preferred oxidants are nitrogen/oxygen mixtures with from 5% oxygen up to 100% oxygen.

The present invention provides a process and apparatus that generates the required reducing gases CO and $H_2$ for heat treating of metals via the direct oxidation reaction:

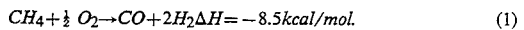

$$CH_4 + \tfrac{1}{2} O_2 \rightarrow CO + 2H_2 \Delta H = -8.5 kcal/mol. \qquad (1)$$

Natural gas and $O_2N_2$ mixtures ranging from nitrogen containing from 5% up to 100% $O_2$ are introduced over a rhodium catalyst which is held at a temperature of at least 600° C. This is the minimum light-off temperature for methane. If propane is used the minimum light-off temperature is about 350° C. The catalyst can be situated in a separate reactor or can be conveniently located inside the furnace. The system operates autothermally, that is, no auxiliary heaters for preheating the input gases or heating the catalyst bed are required. There can be heat exchange from the exiting gases or from the furnace's gases to the catalyst or the input gases. For an ex-situ reactor, the input gases can be optionally preheated to between 500° C. and 650° C. using the available heat in the exit gas. Higher $CO/CO_2$ and $H_2/H_2O$ ratios can be obtained using preheat.

Previously known endothermic generators that deliver either low quality (high $CO_2$ content) or, when purified, high capital cost atmospheres are also based on the overall reaction (1), since at high temperature (e.g., 1000° C.) equilibrium dictates that a 2/1 ratio mixture of methane/oxygen will completely convert to a 2/1 ratio $H_2$ CO mixture. However in prior art endogenerators the approach to equilibrium is slowed because of the formation of total oxidation products $CO_2$ and $H_2O$ resulting in excess $CH_4$ which is subsequently (downstream in the reactor) converted to CO and $H_2$ via the reactions:

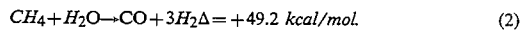

$$CH_4 + H_2O \rightarrow CO + 3H_2 \Delta = +49.2 \; kcal/mol. \qquad (2)$$

and

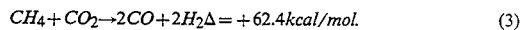

$$CH_4 + CO_2 \rightarrow 2CO + 2H_2 \Delta = +62.4 kcal/mol. \qquad (3)$$

Several embodiments of the present invention will be described as examples:

Referring to FIG. 3, a schematic cross-section of a reactor structure 8 is shown including a body of insulating material 10 having a recess in which a catalyst and carrier combination 12 is disposed. The catalyst is composed of a noble metal such as platinum, rhodium or the like in a porous ceramic carrier such as an alumina carrier. A gas transport system 14 extends into the recess, and includes a first conduit 16 that changes into separate tubes 16a, 16b located within a second conduit 18. Two tubes 16a and 16b are shown for purposes of explanation, however three or more tubes can be used if desired. Input gases such as air/hydrocarbon are directed into conduit 16, are conducted through tubes 16a and 16b and react with the catalyst in combination 12. As previously discussed, a reaction (1) occurs producing CO and $H_2$ as an output gas for methane as the hydrocarbon.

The output gas that enters conduit 18 is hotter than the input gas in tubes 16a and 16b. The output gas in conduit 18 circulates around the tubes 16a and 16b.

The output gas in conduit 18 may then be introduced into a heat treating furnace for the treatment of metals, alloys or metal and ceramic powders.

It should be noted that as the output gases in conduit 18 circulate past the input gases in conduits 16a and 16b, a heat exchange between the output gas and the input gas takes place, so it is not necessary to provide an auxiliary heating means such as heating coils or a flame to heat the incoming gases during operation as in the prior art. It may be necessary however to initially heat the incoming gases at the beginning of the operation to start the heat exchange process.

Figure 4:
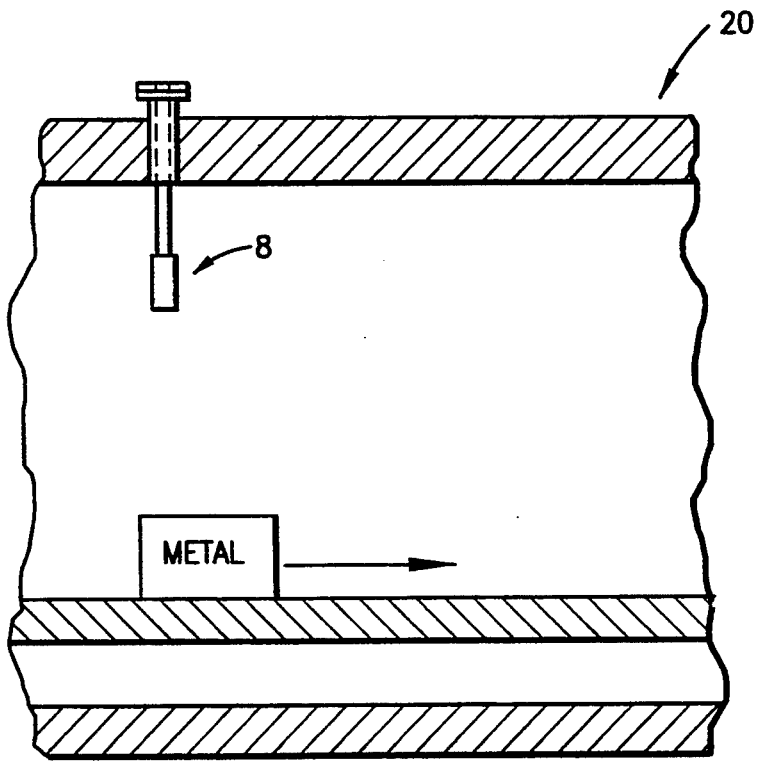
FIG. 4 is a schematic cross-sectional illustration of a heat treating furnace showing a reactor disposed within the furnace according to the principles of the present invention.

Referring to FIG. 4, a schematic cross-section of a typical heat treating furnace 20 is illustrated showing the reactor structure 8 of FIG. 3 located within the furnace. The operation of the reactor structure 8 is as previously described, except that the output gases from the reactor structure is introduced inside the furnace. One advantage of locating the reactor structure 8 within the furnace 20 is that the insulating material 10 may be eliminated from reactor structure 8 so the heat of the furnace can be used in the heat exchange process.

Figure 5:
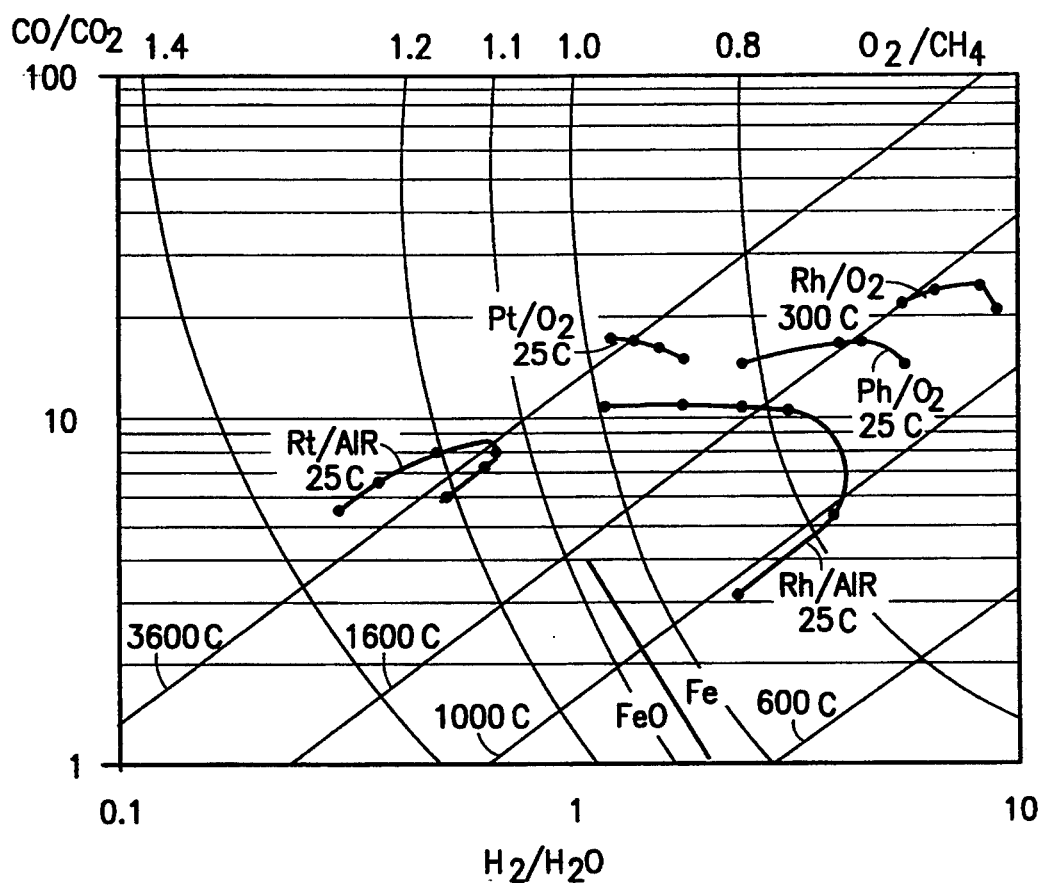
FIG. 5 is a curve illustrating the effect of the reaction of methane mixtures with a platinum or rhodium loaded alumina catalyst.

FIG. 5 illustrates the properties that can be obtained at very high space velocities (1,000,000 standard cubic foot per hour of output gas per cubic foot of catalyst used or higher). No reforming reactions are taking place.

The data illustrated in FIG. 5 was obtained in another embodiment wherein a reticulated alumina foam with about 80 pores per inch was loaded with 10% rhodium by weight. Size of the monolith was $\frac{3}{8}''$ diameter, $\frac{1}{4}''$ length. Catalyst was mounted between 2 cordierite open-channel pieces and heated in a tube furnace. Mixes of methane/air, methane/33% $O_2$ in $N_2$, methane/O2 and propane/air with various O2/hydrocarbon stoichiometries were passed over the catalyst; exit gases were quenched and analyzed for $H_2$, $H_2O$, CO, $CO_2$ and $CH_4$. The results are summarized in FIG. 5. It is seen that for each oxidant used there is an optimum $O_2/CH_4$ ratio in the mix which achieves the highest $CO/CO_2$ and $H_2/H_2O$ ratio. The constant temperature lines indicate the temperatures at which the observed ratios would be in equilibrium. It is clear that these ratios are far from equilibrium since the adiabatic temperatures in the catalyst are in the 600° to 900° C. range depending on the composition and the amount of preheat. If these exit gas mixes are injected into e.g. a steel annealing furnace, the water shift reaction would change the ratios along a constant $O2/CH_4$ line and reach the equilibrium composition at the furnace temperature. It is seen that optimum mixes for the Rh/air(25° C.), Rh/O2(25° C.), Rh/O2(300° C.) and Pt/O2(25° C.) all result in furnace compositions which are reducing to steel and therefore result in bright product. The Pt/air(25° C.) however would be oxidizing to steel since the $H_2$ selectivity is not high enough in the direct oxidation step. As will be shown in the following examples lowering the space velocity will allow the $H_2O$ reforming reaction to occur and satisfactory atmosphere compositions can be achieved with non-preheated Pt/air mixes at these lower space velocities.

In the previous example it was shown that the methane/air mix on a Pt catalyst with no preheat, the direct oxidation reaction can give adequate $CO/CO_2$ ratios but the $H_2/H_2O$ ratio is less than 1. In the second embodiment it is shown that by lowering space velocities $H_2O$ reforming occurs and satisfactory $H_2/H_2O$ ratios are obtained. Space velocities will still be 5 to 10 times higher than in prior art endogenerators. The effect of preheating the reaction mix will also be shown.

A second embodiment platinum catalyst on alumina carrier with 0.5% Pt by weight loading was used in the form of $\frac{1}{8}'' \times \frac{1}{8}''$ cylindrical pellets. Approximately 140 gram of this catalyst was placed in a tube (approx. 1.5" diameter) inside a furnace. An air/methane mix with ratio of about 2.38 was flowed over the catalyst with space velocity of about 16000 standard cubic foot per hour (SCFH) of output gas per cubic foot of catalyst used. Input gas temperature was 24° C. (no preheat); furnace temperature was 760° C. Exit gases from the catalyst bed were quenched and analyzed using a gas chromatograph. $CO/CO_2$ ratio was about 12 and $H_2/H_2O$ ratio was about 11.

In another test an air/methane mix with ratio of about 2.38 was flowed over the catalyst with space velocity of about 16000 standard cubic foot per hour of output gas per cubic foot of catalyst used. Input gas was preheated to 252° C.; furnace temperature was 760° C. The exit gas temperature was 775° C. Exit gases from the catalyst bed were quenched and analyzed using a gas chromatograph. $CO/CO_2$ ratio was about 18 and $H_2/H_2O$ ratio was about 14.

In another test an air/methane mix with ratio of about 2.38 was flowed over the catalyst with space velocity of about 16000 standard cubic foot per hour of output gas per cubic foot of catalyst used. Input gas was preheated to 505° C.; furnace temperature was 760° C. The exit gas temperature was 825° C. Exit gases from the catalyst bed were quenched and analyzed using a gas chromatograph. $CO/CO_2$ ratio was about 24 and $H_2 2/H_2O$ ratio was about 16.

In another test an air/methane mix with ratio of about 2.38 was flowed over the catalyst with space velocity of about 16000 standard cubic foot per hour of output gas per cubic foot of catalyst used. Input gas was preheated to 654° C.; furnace temperature was 870° C. The exit gas temperature was 794° C. Exit gases from the catalyst bed were quenched and analyzed using a gas chromatograph. $CO/CO_2$ ratio was about 80 and $H_2/H_2O$ ratio was about 41.

From these examples it is clear that high ratios can be obtained with methane/air mixes over Pt catalysts at space velocities of 16000 standard cubic foot per hour of output gas per cubic foot of catalyst used. Preheating the input gases will increase the ratios. From the observed exit gas temperatures it is clear that the input gases can be preheated using standard gas to gas heat exchangers. No external heat input is required.

In the present invention, propane as well as methane can be used as the hydrocarbon gas.

Thus, in one propane embodiment, a platinum catalyst on alumina carrier with 1% Pt by weight loading was used in the form of ⅛" diameter spherical pellets. An air/propane mix with a ratio of about 7.11 was flowed over the catalyst with a space velocity of 100,000 standard cubic foot per hour of output gas per cubic foot of catalyst used. Input gas temperature was 81° C.; furnace temperature was 870° C. Exit gases from the catalyst bed were quenched and analyzed using a gas chromatograph. CO/CO$_2$ ratio was about 31 and H$_2$O ratio was about 27.

Also, an O$_2$% in oxidant <21% (air) can be employed.

Thus, in still another embodiment, a platinum catalyst on alumina carrier with 1% Pt by weight loading was used in the form of ⅛" diameter spherical pellets. The oxidant was a N$_2$/O$_2$ mixture of 12% O$_2$. An oxidant/methane mix with a ratio of about 16.7 was flowed over the catalyst with a space velocity of 50,000 hr$^{-1}$ standard cubic foot per hour of output gas per cubic foot of catalyst used. Input gas was preheated to 335° C.; furnace temperature was 870° C. Exit gases from the catalyst bed were quenched and analyzed using a gas chromatograph. CO/CO$_2$ ratio was about 10 and H$_2$/H$_2$O ratio was about 8.

In the third embodiment, a platinum catalyst on alumina carrier with 0.5% Pt by weight loading was used in the form of ⅛"×⅛" cylindrical pellets. Approximately 16 lbs of this catalyst was placed in 2 identical containers, each approximately 5.5" diameter and 30" long, inside an industrial pusher furnace. One injector is detailed in FIG. 4. A total of 935 SCFH of natural gas and 2225 SCFH of air was mixed in a fuel/air mixing machine and flowed over the catalyst beds using a space velocity of about 16000 standard cubic foot per hour of output gas per cubic foot of catalyst used. Furnace temperature was 732° C. About 4700 SCFH of reacted gas was produced from the injectors. CO/CO$_2$ ratio as measured at the injector exit in the furnace was about 8 and H$_2$/H$_2$O ratio was about 16. 6600 SCFH of N$_2$ with about 0.8% Oxygen from a membrane unit was also injected. About 150 SCFH of propane was added as an enriching gas. Analysis of furnace composition showed 8% CO, 0.9% CO$_2$, 15% H$_2$ and .8% H$_2$O. This atmosphere allowed decarb-free annealing of a variety of low and medium carbon steels.

Figure 6:
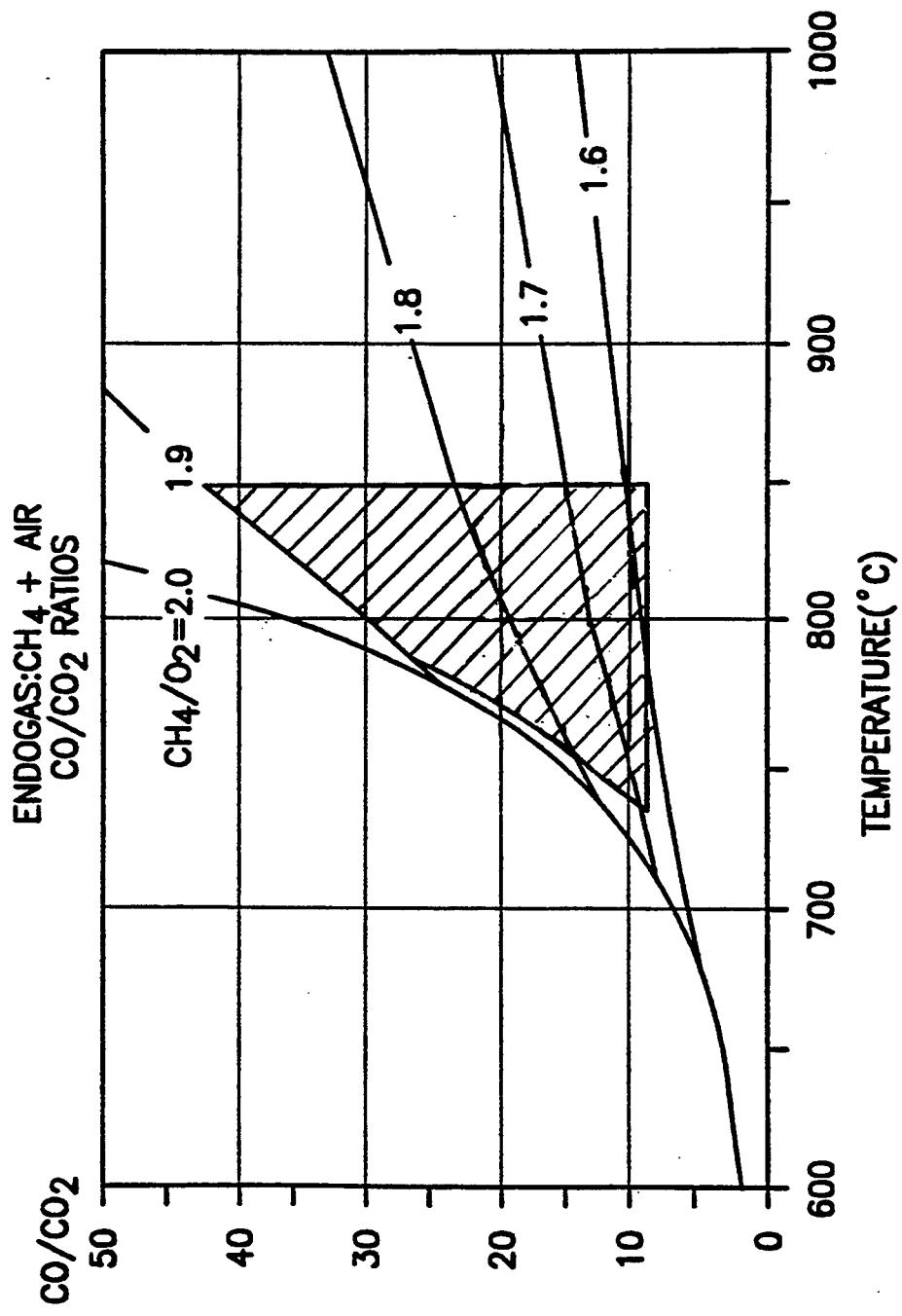
FIGS. 6 and 7 are curves illustrating the operational features of an endothermic reactor according to the principles of the present invention.
Figure 7:
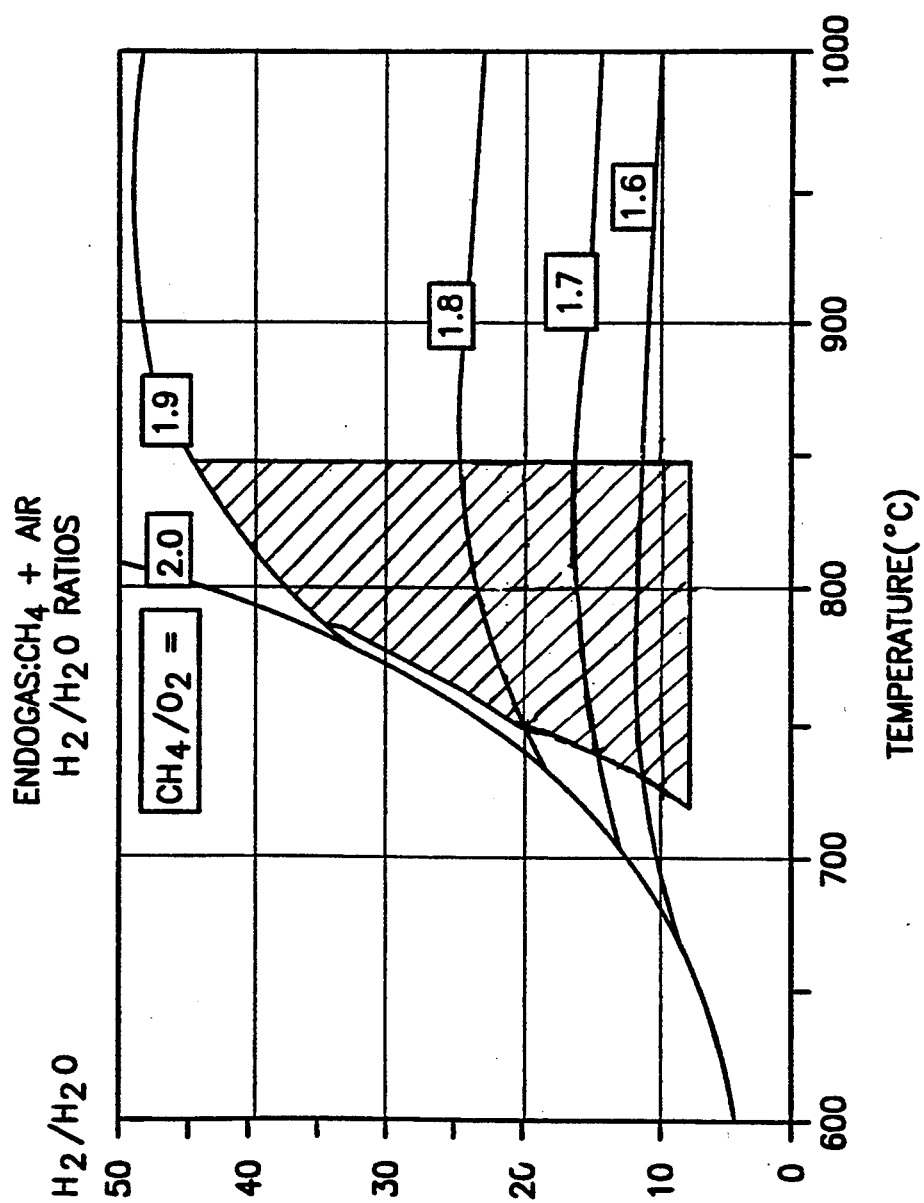

FIGS. 6 and 7 illustrate the operational domain for the endothermic reactor of the present invention. Its essential feature is that the O$_2$ content in the mix is sufficiently high (>5%) and enough CO$_2$ and H$_2$O is allowed to form to bring the adiabatic reactor temperature to the operating temperature of noble metal catalysts. A modest amount of preheat can be added if higher ratios are desired.

The output of this endothermic reactor can be advantageously mixed with inexpensive nitrogen from a non-cryogenic source to obtain atmospheres suitable for heat treating.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. A method for the endothermic generation of carbon monoxide and hydrogen atmospheres for the heat treating of ferrous metals, non-ferrous metals, alloys and metal and/or ceramic powders comprising the steps of:

Step 1. disposing a catalyst means containing a noble metal on a porous ceramic carrier means;

Step 2. directing input gases, including hydrocarbon gas and oxygen (O$_2$), through a conduit and onto said noble metal catalyst means at a temperature in the range of from about 750° to about 900° C., wherein said hydrocarbon gas oxidizes to produce output gases consisting essentially of carbon monoxide and hydrogen wherein the space velocity of said output gases is at least 10,000 units per hour.

2. A method according to claim 1 wherein said porous ceramic carrier means provided in step 1 is composed of alumina.

3. A method according to claim 1, wherein said porous ceramic carrier means is composed of a ceramic selected from the group including silica, zirconia, titania and magnesia.

4. A method according to claim 1 wherein said catalyst means is composed of a noble metal selected from the group including osmium, iridium and palladium.

5. A method according to claim 1 wherein said catalyst means provided in step 2 is composed of rhodium.

6. A method according to claim 1 wherein said catalyst means is composed of platinum.

7. A method according to claim 1 wherein said catalyst means is composed of ruthenium.

8. A method according to claim 1 wherein said hydrocarbon gas provided in step 2 is methane.

9. A method according to claim 1 wherein said hydrocarbon gas is propane.

10. A method according to claim 1 wherein said hydrocarbon gas is an alkane selected from the group including butane and ethane.

11. A method according to claim 1 wherein said hydrocarbon gas is an alkene selected from the group including ethylene and propylene.

12. A method according to claim 2 wherein said alumina carrier means is a reticulated alumina foam having pores therein, wherein said catalyst means is rhodium and is combined with said alumina foam carrier means, wherein said hydrocarbon gas is methane, and wherein said oxidation of said methane produces carbon monoxide and hydrogen according to the equation $$CH_4 + \tfrac{1}{2} O_2 \rightarrow CO + 2H_2$$

13. A method according to claim 2 wherein said alumina carrier means is a reticulated alumina foam having pores therein, wherein said catalyst means is platinum and is combined with said alumina foam carrier means, wherein said hydrocarbon gas is methane, and wherein said oxidation of said methane produces carbon monoxide and hydrogen according to the equation $$CH_4 + \tfrac{1}{2} O_2 \rightarrow CO + 2H_2$$

14. A method according to claim 1 wherein said conduit for directing said hydrocarbon gas and said oxygen onto said catalyst means is a first conduit, and wherein said method further includes the step of directing said output gases through a second conduit surrounding said first conduit for wherein a heat exchange occurs from said output gases to said input gases.

15. A method according to claim 1 further including the step of mounting said carrier and catalyst means provided in step 1 within a heated furnace wherein metals and metal or ceramic powders are heat treated by said furnace heat wherein said carbon monoxide and hydrogen of said output gases provide a buffer atmosphere for oxygen wherein said furnace, and wherein said furnace heat used as said non auxiliary heat source for heating said input gases.

* * * * *